United States Patent

Sencer

[11] 4,031,331
[45] June 21, 1977

[54] TELEPHONE SPEECH NETWORK

[75] Inventor: Mevhibe Gulay Sencer, Ottawa, Canada

[73] Assignee: Northern Electric Company Limited, Montreal, Canada

[22] Filed: Jan. 15, 1976

[21] Appl. No.: 649,557

[52] U.S. Cl. .......................... 179/81 A; 179/170 T
[51] Int. Cl.² ......................................... H04M 1/58
[58] Field of Search .......... 179/81 A, 81 R, 170 T, 179/170 NC, 170.2, 170.6, 170.8

[56] References Cited
UNITED STATES PATENTS

| | | | |
|---|---|---|---|
| 3,440,367 | 4/1969 | Holtz | 179/81 A |
| 3,530,260 | 9/1970 | Gaunt | 179/81 A |
| 3,823,272 | 7/1974 | Tabalba | 179/81 A |

Primary Examiner—Kathleen H. Claffy
Assistant Examiner—Joseph A. Popek
Attorney, Agent, or Firm—John E. Mowle

[57] ABSTRACT

In an electronic telephone a speech network for connecting a transmitter and receiver to a line powered telephone line which utilizes a bridge configuration that is so arranged that the network will function on very low d-c line voltages, thereby enabling the set to be connected in multi-party applications with a conventional hybrid transformer set on long loop applications.

4 Claims, 3 Drawing Figures

TELEPHONE SPEECH NETWORK

This invention relates to an electronic speech network for connecting a transmitter and receiver to a telephone line and more particularly to one which provides improved sidetone suppression over a wide range of loop lengths together with a reduction in the d-c voltage requirements of the telephone set so as to permit parallel operation with a conventional set in long-loop applications.

BACKGROUND OF THE INVENTION

Traditional speech network circuits for telephone sets have been constructed with a hybrid transformer, designed to provide some degree of isolation between signals that are simultaneously transmitted and received over a two-wire telephone line. The elimination of hybrid transformers by using an electronic speed network results in a considerable size and weight reduction, while providing the opportunity for improvements in telephone system performance.

Various such electronic speech networks have been proposed in the past, some utilizing the gyrator principle while others are based on a bridge configuration, to provide the necessary anti-sidetone network for the telephone set. One such circuit which is based on this latter concept is disclosed in Canadian Pat. No. 843,513 entitled: "Non-Reactive Anti-Sidetone Network for a Telephone Set"; invented by Roger E. Holtz, issued June 2, 1970. A common problem with these prior art circuits is that they are not able to work in parallel with the conventional hybrid transformer telephones in long-loop applications, because the heavy current drain of the latter reduces the available voltage on the line to the point where the electronic network ceases to function. In general, this results from the circuit arrangement which necessitates some form of regulation or isolation connected in series with the semiconductor amplifiers of the network. As a result, the accumulative voltage drops encountered across the several semiconductor devices connected in series across the telephone line, limits the minimum applied voltage to the telephone set at which it will continue to operate. Consequently electronic speech networks have not generally been used in telephones in the past because they did not have the capability to work in parallel with a traditional hybrid set.

STATEMENT OF THE INVENTION

These disadvantages of the prior circuits have been overcome in the present invention which provides an electronic speech network for a telephone set based on a bridge configuration which functions at very low d-c voltages.

Thus, in accordance with the present invention there is provided a telephone speed network, for connecting a transmitter and a receiver to a telephone line which comprises: an amplifier, the output of which is connected in series with a line terminating resistance across the telephone line, the input to said amplifier being responsive to both received signals on the telephone line and to signals at the output of the transmitter. A bridging resistance and a bridging impedance are connected in series across the amplifier output for summing substantially equal magnitude receive signal currents and for subtracting substantially equal magnitude transmit signal currents coupled from the output of the amplifier and from the telephone line to the junction of the bridging resistance and impedance. In addition, the speech network includes a voltage controlled current amplifier for connecting the resultant signals at the junction of the bridging resistance and impedance to the receiver.

This arrangement is such that the line terminating resistance provides the effective load across the telephone line for both the transmit and receive signals thereby providing a substantially constant and resistive termination to the line which provides improved balance with line variations. In addition, summing the receive signal currents from the telephone line and from across the line terminating resistance, and subtracting the corresponding transmit signal currents, results in an effective 6 db improvement in the transhybrid loss of the network which extends over a wide range of loop lengths. Also, improved equalization to make the receive and transmit levels constant over a wide range of loop lengths, may be readily incorporated in this circuit arrangement by varying the gain of the voltage controlled current amplifiers which may be utilized in both the transmit and receive paths.

BRIEF DESCRIPTION OF THE DRAWINGS

An example embodiment of the invention will now be described with reference to the accompanying drawings in which.

DESCRIPTION OF THE PREFERRED EMBODIMENT

In the following detailed description, several of the components have been left undesignated and are not described in detail where their function would be obvious to those skilled in the art.

Figure 1:
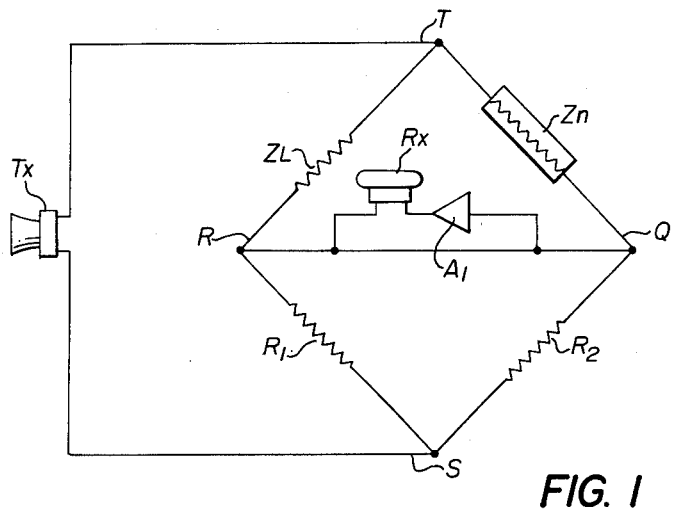
FIG. 1 illustrates a functional circuit diagram of a hybrid network for connecting a transmitter and receiver to a telephone line in accordance with the prior art.

The functional bridge circuit of the prior art illustrated in FIG. 1, is basically of the type taught in the above-mentioned Canadian Patent to Holtz. The four branches of the bridge include a telephone line impedance $Z_L$, a transmitter load resistance $R_1$, a bridging impedance $Z_n$ and a bridging resistance $R_2$ which are connected in a conventional bridge configuration. A transmitter $T_x$ is connected across one pair of opposite corners S and T, while an effective short circuit is connected across the other pair of opposite corners Q and R of the bridge. The received signal is derived from across the effective short Q-R and is coupled through a receive amplifier A, to the receiver $R_x$.

Figure 2:
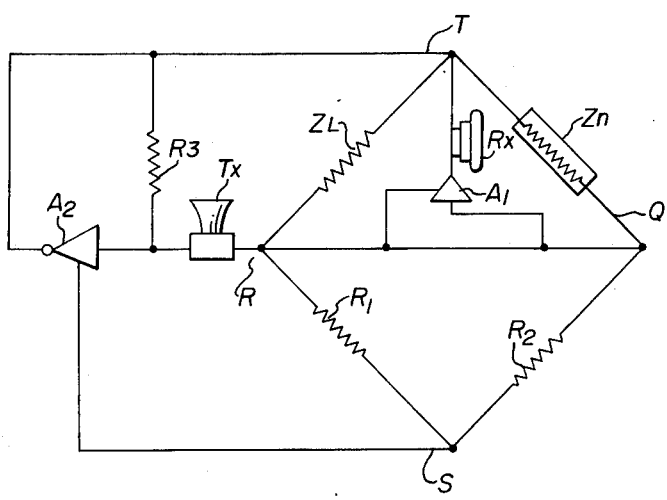
FIG. 2 illustrates a functional diagram of a hybrid network for connecting a transmitter and receiver to a telephone line in accordance with the present invention.

The basic bridge configuration shown in FIG. 2 of the present invention is the same as that illustrated in FIG. 1. The received signal is again developed across the effective short Q-R. However, on the transmitter side, the output of the transmitter $T_x$ is connected through a transmit amplifier $A_2$, the inverted output of which is again applied between corners S and T of the bridge. However, the essential difference which provides an improvement in the effective transhybrid loss is the utilization of the feedback path comprising a feedback resistor $R_3$ which connects the received signal from across the telephone line $Z_L$ to the input of the transmit amplifier $A_2$.

The effect of this feedback arrangement on the improved transhybrid loss is manifest as follows. The speech network interfaces the transmitter $T_x$ and receiver $R_x$ with the telephone line $Z_L$. It directs maximum line signal strength to the receiver $R_x$ from the line $Z_L$ and directs maximum signal from the transmitter $T_x$ to the line $Z_L$. The effectiveness of the network is measured by the amount of isolation it provides, called the effective hybrid loss $\theta$. The effective hybrid loss $\theta$ is defined as the "difference between the receive level in the receiving mode $V_{RR}$ and the receive level in the transmitting mode $V_{RT}$ for the same line signal level".

Thus:
$$\eta = H_S - (H_T + H_R) = 20 \log (V_{RR}/V_{RT}) \quad (1)$$

where:

$H_T = 20 \log (V_1/V_L)$, transmit loss
$H_R = 20 \log (V_L/V_{RR})$, receive loss
$H_S = 20 \log (V_1/V_{RT})$, sidetone loss
$V_1 =$ voltage across $R_1$
$V_L =$ voltage across $R_L$.

In the prior art circuit of FIG. 1, the received signal developed across line impedance $Z_L$ appears primarily across the bridging impedance $Z_n$ while very little received signal appears across the bridging resistor $R_2$ because of the efffective short circuit between Q and R. However, in the embodiment of the invention illustrated in FIG. 2, the received signal from the telephone line $Z_L$ is also coupled through the feedback resistor $R_3$ and appears at the input to the transmit amplifier $A_2$. Since the inverted output of the transmit amplifier $A_2$ is connected between points T and S, the received signal is also applied in phase to the line terminating resistor $R_1$. The input to the receive amplifier $A_1$ is the sum of the currents flowing between Q and R. In the receive mode, the signal currents through bridging resistor $R_3$ and impedance $Z_n$ are additive while in the transmit mode, they are subtractive. Consequently, the voltages developed across the receiver $R_x$ are as follows:

Receive signal voltages developed across receiver impedance $R_x$:

$$V_{RR} = V_L \left[ \frac{1}{R_2} + \frac{1}{Z_n} \right] R_x \cdot A_1 \quad (2)$$

Transmit signal voltages developed across receiver impedance $R_x$:

$$V_{RT} = V_L \left[ \frac{1}{Z_n} - \frac{R_1}{Z_L R_2} \right] R_x \cdot A_1 \quad (3)$$

Substituting equations (2) and (3) in (1) yields:

$$\eta = 20 \log \frac{1 + \frac{Z_n}{R_2}}{1 - \frac{R_1 Z_n}{R_2 Z_L}} \quad (4)$$

Assuming that $R_2$ and $Z_n >> R_1$ infinite transhybrid loss will be achieved when:

$$\frac{R_1}{Z_L} = \frac{R_2}{Z_n} \quad (5)$$

Since the line impedance $Z_L$ changes according to the characteristics of the subscriber loop, the transhybrid loss will change accordingly. However, in equation (4), the term $Z_n/R_2$ in the numerator is due to the feedback provided by the resistor $R_3$. For $Z_n = R_2$, the transhybrid loss is improved by 6 db.

The components of the bridging impedance $Z_n$ are selected so as to match the average impedance of the telephone line $Z_L$. The resistor $R_1$ is in series with the output of the amplifier $A_2$ across the telephone line $Z_L$ and thus provides a resistive termination for it. While the negative feedback provided by the resistor $R_3$ lowers the output voltage from the transmit amplifier $A_2$ and hence the magnitude of the transmit signal applied to the line $Z_L$, the overall effect is an improvement in the transhybrid loss. The coefficients of amplifiers $A_1$ and $A_2$ may be varied according to the line length to provide amplitude equalization. Since additional gain in the amplifier $A_2$ may be readily obtained in practice, the circuit of FIG. 2 provides improved performance of the overall telephone set.

Figure 3:
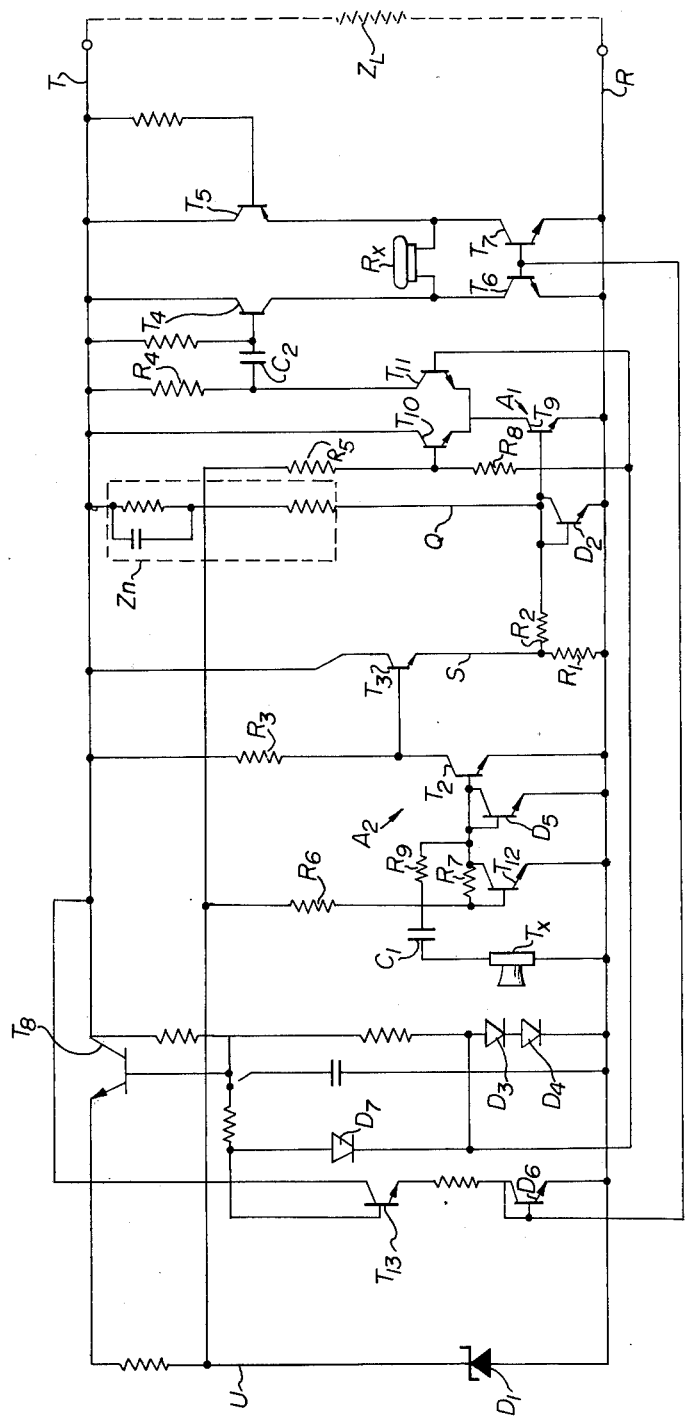
FIG. 3 illustrates a schematic circuit diagram of a telephone speech network based on the functional network illustrated in FIG. 2.

The realization of the functional circuit shown in FIG. 2 is illustrated in the detailed schematic diagram of FIG. 3. The basic components have identical reference characters to those used in FIG. 2. However, unlike FIG. 2, the output of the receive amplifier $A_1$ is developed across the load resistor $R_4$ rather than directly across the receiver $R_x$. With this arrangement, the receiver $R_x$ is a-c isolated from the telephone line $Z_L$ by means of a differential amplifier driven from constant current sources as explained hereafter. This permits the utilization of a low receiver impedance of 150 ohms without affecting the line termination at signal frequencies.

The operation of the circuit will now be described for transmit signals. The output of the transmitter $T_x$ is coupled through the capacitor $C_1$ and after amplification by transistors $T_2$ and $T_3$ appears across the emitter-collector electrodes of the latter. The transmit signal is coupled through the line terminating resistance $R_1$ and is developed across the telephone line $Z_L$. The signal current applied to T and R of the line $Z_L$ in the transmit mode is substantially equal to $V_L/R_1$. The transmit signal produces substantially equal and opposite currents through the bridging resistor $R_2$ and the bridging impedance $Z_n$ so that they are largely controlled at Q. As a result, only a small controlled signal having the desired sidetone level appears at Q and is coupled through the amplifier $A_1$ across resistor $R_4$. This is necessary so that the party using the telephone will not receive the impression that their telephone is not functioning.

In the receive mode, received signals on the telephone line $Z_L$ appearing between T and R are coupled through the resistor $R_3$ and applied to the transistor $T_3$. The received signals appear across the line terminating resistor $R_1$ which generates a current through the bridging resistor $R_2$. Simultaneously, the received signal current on the line $Z_L$ is coupled in-phase through bridging impedance $Z_n$ so that both signal currents add at Q. This signal is then coupled through the amplifier $A_1$ and appears across the resistor $R_4$. The receive signal across $R_4$ is coupled through a capacitor $C_2$ and applied to the base of a transistor $T_4$ which forms one half of a differential amplifier of which the other half is formed by transistor $T_5$. The differential signal developed between the emitters of the transistors $T_4$ and $T_5$ is applied to the receiver $R_x$. In order to a-c isolate the receiver $R_x$ from the telephone line $Z_L$ the transistors $T_4$ and $T_5$ are driven from constant current sources provided by transistors $T_6$ and $T_7$. The level of receive signal clipping is also controlled by the amount of current going through these constant current sources.

Both the voltage-controlled current amplifiers $A_1$ and $A_2$ utilize amplitude equalization to achieve constant receive and transmit levels over a wide range of loop lengths. To achieve this the applied d-c voltage on the line (+ on T and − on R) is filtered by a transistor $T_8$ to remove the a-c component and provide a d-c voltage at U which is proportional to line length. A zener diode $D_1$ limits the voltage at U on very short loops and normally does not conduct in long loop applications.

Referring to the receive amplifier $A_1$, a-c signals at Q are applied across the low impedance path to R provided by a transistor which is wired as a diode $D_2$. This provides a low impedance voltage source which is applied to a current amplifier comprising transistor $T_9$. The current through the transistor $T_9$ divides between the transistors $T_{10}$ and $T_{11}$. The base of the transistor $T_{11}$ is tied to a substantially constant voltage source generated across the two series connected diodes $D_3$ and $D_4$. On the other hand, the base of the transistor $T_{10}$ is connected to the line varying d-c voltage U through a resistor $R_5$.

As the loop length increases, the available voltage at U decreases which lowers the voltage applied to the base of the transistor $T_{10}$. As a result, this tends to increase the current flow through transistor $T_{11}$ and hence increase the applied signal across the resistor $R_4$ which tends to compensate for the decreased signal level being received between T and R on the telephone line $Z_L$ due to the increased line length.

In the receive amplifier $A_1$, the signal which flows through resistor $R_2$ and impedance $Z_n$ is d-c coupled to the transistor $T_9$. With a short line $Z_L$, the amount of d-c current coming through these paths is higher than the current through resistor $R_5$. The corresponding base currents must be supplied by the control current. To achieve this, the circuit is arranged and the impedances of resistors $R_5$ and $R_8$ are selected such that the base currents are negligible with respect to the current through resistor $R_5$. This is achieved without adding to the d-c current through transistor $T_{11}$.

Correspondingly, the transmit signals coupled through the capacitor $C_1$ and resistor $R_9$ are applied across a transistor wired as a diode $D_5$ which provides a voltage source for coupling signals to the current amplifier of the transistor $T_2$. The line length dependant d-c voltage from U is coupled through the resistor $R_6$ and is applied to the base of the transistor $T_{12}$. As the voltage at U decreases with longer loop lengths, the applied voltage at the base of the transistor $T_{12}$ decreases correspondingly lowering the current flow therethrough thereby decreasing the loading across the diode $D_5$. This increases the transmit signal level applied to the base of the transistor $T_2$. The difference between the emitter-base voltages of transistor $T_{12}$ and diode $D_5$ is determined by the voltage drop across resistor $R_7$ which is determined by the d-c current flowing through resistor $R_6$. This d-c current and the a-c signal current flowing through resistor $R_9$ from the transmitter $T_x$ divides between transistor $T_{12}$ and diode $D_5$. The a-c signal current is coupled to the amplifier $A_2$ and is small with respect to current through resistor $R_6$. Consequently, the gain of the amplifier $A_2$ is inversely proportional to the voltage at U.

The transistor $T_{13}$ provides a substantially constant voltage source at its emitter which is coupled across a transistor wired as a diode $D_6$. The input to the transistor $T_{13}$ is obtained from across the relatively constant voltage source provided by the series connected diodes $D_3$, $D_4$ and $D_7$. The diode $D_6$ provides a current splitting load and utilizes a transistor wired as a diode so as to provide the same operating characteristics as the base emitter junctions of transistors $T_6$ and $T_7$. As mentioned previously, the zener diode $D_1$ is normally not conducting in long loop applications. However, in short loop applications where the line voltage substantially increases, the diode $D_1$ clamps the voltage at U so as to limit the gain of the amplifiers $A_1$ and $A_2$.

Utilizing an electronic speech network of the type illustrated in FIG. 3, permits parallel operation with a conventional hybrid transformer telephone set with line lengths up to 1300 ohms, or a minimum line voltage of 2.5 volts d-c. In operation of a telephone having an electronic network, in parallel with a conventional hybrid transformer telephone at long lines, most of the required line current is used by the latter. The balance of the current is utilized by the amplifiers in the electronic speech network.

What is claimed is:

1. A telephone speech network, for connecting a transmitter and a receiver to a line powered telephone line, comprising:
    a first amplifier, the output of which is connected in series with a line terminating resistance across the telephone line, the input to said amplifier being responsive to both the received signals on the telephone line and to the signals at the output of the transmitter;
    a bridging resistance and a bridging impedance connected in series across said amplifier, for summing substantially equal magnitude receive signal currents and for subtracting substantially equal magnitude transmit signal currents, coupled from the output of the amplifier and from across the telephone line to the junction of said bridging resistance and impedance; and
    a second amplifier means for connecting the resultant signals at said junction to said receiver.

2. A telephone speech network, for connecting a transmitter and a receiver to a line powered telephone line, comprising:
    an output transistor having its collector connected to one side of the telephone line and its emitter connected in series with a line terminating resistor to the other side of the telephone line;
    means for connecting the transmitter between the base of the output transistor and said other side of the telephone line;
    a feedback resistor connected between said one side of the telephone line and said base;
    a bridging impedance and a bridging resistance serially connected between said one side of the telephone line and said emitter for summing substantially equal magnitude receive signal currents and for subtracting substantially equal magnitude transmit signal currents coupled from the emitter and from the telephone line to the junction of said bridging resistance and impedance;

signal amplifier means for connecting the resultant signals at said junction to one end of a receiver terminating resistor, the other end of said receiver terminating resistor being connected to said one side of the telephone line; and power amplifier means for connecting the signal across said receiver terminating resistor to said receiver.

3. A telephone speech network as defined in claim 2 in which the power amplifier means comprises a differential amplifier having one input connected to the inverted output of said signal amplifier means and the other input connected to said one side of the telephone line, and the receiver being connected between the differential outputs of said differential amplifier.

4. A telephone speech network as defined in claim 2 in which the means for connecting the transmitter includes a voltage-controlled current amplifier which comprises:

first, second and third transistors, the emitters of which are connected to said other side of the telephone line, the collector of the first transistor being connected to the base of the third transistor, the base and collector of the second transistor being connected together and to the base of the third transistor and the collector of the third transistor being coupled to the base of said output transistor;

a source of d-c voltage derived from across the line powered telephone line;

first and second resistors serially connected between said d-c source and said base of the third transistor, the base of the first transistor being connected to the junction of the first and second resistors; and a third resistor coupled between the transmitter and the base of the third transistor;

whereby the magnitude of the transmit signal at the collector of the third transistor varies inversely as the d-c voltage from said source.

* * * * *